United States Patent
Kim et al.

(10) Patent No.: US 9,758,141 B2
(45) Date of Patent: Sep. 12, 2017

(54) INITIALIZATION METHOD FOR ELECTRO-MECHANICAL BRAKE

(71) Applicant: HYUNDAI MOBIS CO., LTD., Seoul (KR)

(72) Inventors: Jong Sung Kim, Yongin-si (KR); Soung Jun Park, Ansan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 385 days.

(21) Appl. No.: 14/701,347

(22) Filed: Apr. 30, 2015

(65) Prior Publication Data
US 2016/0010668 A1    Jan. 14, 2016

(30) Foreign Application Priority Data

Jul. 9, 2014    (KR) .................. 10-2014-0085961
Sep. 4, 2014    (KR) .................. 10-2014-0117901

(51) Int. Cl.
| | |
|---|---|
| *B60T 13/00* | (2006.01) |
| *B60T 13/08* | (2006.01) |
| *B60T 7/20* | (2006.01) |
| *B60T 8/48* | (2006.01) |

(52) U.S. Cl.
CPC .............. *B60T 13/08* (2013.01); *B60T 7/20* (2013.01); *B60T 8/4872* (2013.01)

(58) Field of Classification Search
CPC . B60T 11/10; B60T 7/20; B60T 7/042; B60T 8/32
USPC ........ 188/1.11 E, 72.3, 72.4, 72.6, 158, 160, 188/170; 303/3, 7, 20, 57, 61
See application file for complete search history.

(56) References Cited

U.S. PATENT DOCUMENTS

| | | | | | |
|---|---|---|---|---|---|
| 3,613,839 | A | * | 10/1971 | MacDuff ................ | B60T 11/10 188/160 |
| 3,893,549 | A | * | 7/1975 | Bennett .................. | B60T 17/22 188/170 |
| 4,428,462 | A | * | 1/1984 | Warwick ................ | F16D 65/18 188/347 |
| 4,638,894 | A | * | 1/1987 | Sitabkhan .............. | B66D 5/14 188/170 |
| 5,906,253 | A | * | 5/1999 | Rancourt ............... | B64C 25/36 188/264 AA |

(Continued)

FOREIGN PATENT DOCUMENTS

KR    10-2011-0065845 A    6/2011

*Primary Examiner* — Christopher Schwartz
(74) *Attorney, Agent, or Firm* — Knobbe Martens Olson & Bear LLP

(57) ABSTRACT

An initialization method for an EMB may include: opening an in-valve for controlling a flow path through which brake oil is introduced from a master cylinder, closing an out-valve for controlling a flow path through which the brake oil is transferred to an accumulator part, and driving a motor to move a master piston forward; when the master piston is moved by a preset distance after coming in contact with a slave piston which is brought in contact with an inner pad, closing the in-valve and driving the motor to move the master piston backward; when the contact between the master piston and the slave piston is released, determining whether a gap between the master piston and the slave piston is equal to or more than a preset gap; and when the gap is equal to or more than the preset gap, ending initialization of the EMB.

18 Claims, 17 Drawing Sheets

(56) References Cited

U.S. PATENT DOCUMENTS

| | | | | |
|---|---|---|---|---|
| 6,969,126 | B2* | 11/2005 | Ichinose | B60T 7/042 188/1.11 E |
| 7,264,093 | B2* | 9/2007 | Hashida | B60T 8/32 188/106 P |
| 7,458,445 | B2* | 12/2008 | Inagaki | F16D 65/18 188/71.9 |
| 9,205,825 | B2* | 12/2015 | Isono | B60T 13/741 |
| 9,346,446 | B2* | 5/2016 | Kim | B60T 13/741 |
| 9,371,845 | B2* | 6/2016 | Japelt | F16D 65/74 |
| 2002/0020591 | A1* | 2/2002 | Schanzenbach | B60T 13/745 188/158 |
| 2003/0062228 | A1* | 4/2003 | Ichinose | B60T 7/042 188/72.3 |
| 2008/0093917 | A1* | 4/2008 | Vescovini | B60T 13/22 303/3 |
| 2014/0103237 | A1* | 4/2014 | Herges | B60T 7/20 251/129.01 |
| 2015/0136538 | A1* | 5/2015 | Kim | B60T 13/741 188/72.6 |
| 2016/0325724 | A1* | 11/2016 | Lee | B60T 13/662 |

* cited by examiner

INITIALIZATION METHOD FOR ELECTRO-MECHANICAL BRAKE

CROSS-REFERENCES TO RELATED APPLICATIONS

The present application claims priority to Korean application numbers 10-2014-0085961 and 10-2014-0117901, filed on Jul. 9, 2014 and Sep. 4, 2014, respectively, which are incorporated by reference in their entirety.

BACKGROUND

The present disclosure relates to an initialization method for an EMB (Electro-Mechanical Brake), and more particularly, to an initialization method for an EMB, which secures a gap between a master piston and a slave piston in a hydraulic EMB (hEMB), and maintains the effect of boosted hydraulic pressure in a braking section.

In general, a brake device refers to a device for decelerating or stopping a vehicle. Recently, an EMB has been developed to replace existing hydraulic brake systems. The EMB includes a smaller number of parts than the hydraulic brake systems, and can be reduced in weight. Furthermore, the EMB has excellent modularity and braking performance.

In the EMB, a hydraulic pipe and a hydraulic piping for guiding hydraulic pressure can be replaced with an electric wire Thus, the EMB can reduced the weight of the vehicle.

When the EMB is applied to both of the front and rear wheels of the vehicle, an ESC (Electronic Stability Control) function can be implemented without a separate ESC module. However, a system, which brakes the front wheels through an EMB and brakes the rear wheels through a general hydraulic pressure brake, includes an ESC module to implement the ESC function.

The related technology is disclosed in Korean Patent Laid-open Publication No. 10-2011-0065845 published on Jun. 16, 2011 and entitled "Brake System of Vehicle".

SUMMARY

Embodiments of the present invention are directed to an initialization method for an EMB, which secures a gap between a master piston and a slave piston and a gap between a brake pad and a brake disk in an hEMB which brakes a vehicle by pressurizing the brake pad, or particularly the slave piston brought in contact with the brake pad, using the pressure of the master piston driven by a motor, thereby stably secure an effect of boosted hydraulic pressure in a braking section.

In one embodiment, an initialization method for an EMB may include: opening an in-valve for controlling a flow path through which brake oil is introduced from a master cylinder, closing an out-valve for controlling a flow path through which the brake oil is transferred to an accumulator part, and driving a motor to move a master piston forward; when the master piston is moved by a preset distance after coming in contact with a slave piston which is brought in contact with an inner pad for forming a braking force, closing the in-valve and driving the motor to move the master piston backward; when the contact between the master piston and the slave piston is released, determining whether a gap between the master piston and the slave piston is equal to or more than a preset gap; and when the gap is equal to or more than the preset gap, ending initialization of the EMB.

The determining of whether the gap between the master piston and the slave piston is equal to or more than the preset gap may include: when it is determined that the gap is less than the preset gap, opening the out-valve, and driving the motor to move the master piston forward until the master piston comes in contact with the slave piston; when the master piston comes in contact with the slave piston, opening the in-valve, closing the out-valve, and driving the motor to move the master piston forward by the preset distance; and when the master piston is moved by the preset distance after coming in contact with the slave piston, closing the in-valve, opening the out-valve, and driving the motor to move the master piston backward.

The slave piston may be moved by hydraulic pressure which is formed according to the movement of the master piston.

As the master piston has a smaller cross-sectional area than the slave piston, the master piston may have a larger displacement than the slave piston.

As the in-valve is opened, the brake oil may be introduced into the slave piston from the master cylinder.

As the out-valve is opened, the brake oil introduced into the slave piston may be transferred to the accumulator part.

When a current of the motor is equal to or more than a preset current while the master piston is moved forward, it may be determined that the master piston is brought in contact with the slave piston.

The determining of whether the gap between the master piston and the slave piston is equal to or more than the preset gap may include determining whether the gap between the master piston and the slave piston is equal to or more than the preset gap, by referring to the backward moving distance of the master piston and the displacement of the slave piston which is moved through hydraulic pressure formed by the brake oil introduced into the slave piston.

The EMB may include an hEMB which brakes a vehicle using the master piston which is moved by the motor and the slave piston which is moved through hydraulic pressure formed by the brake oil introduced into the slave piston according to the movement of the master piston.

In another embodiment, an initialization method for an EMB may include: a contact determination step of determining whether a master piston and a slave piston are brought in contact with each other before a brake pad and a brake disk are brought in contact with each other by the slave piston moved in connection with the master piston, when an in-valve for controlling entry and exit of brake oil to and from a master cylinder is closed, an out-valve for controlling entry and exit of brake oil to and from an accumulator part is closed, and a motor is rotated to move the master piston forward; a piston gap determination step of determining whether a moving distance required until the master piston comes in contact with the slave piston corresponds to a first section, when the master piston is moved forward in state where the out-valve is opened, in case where it is determined that the brake pad and the brake disk were brought in contact with each other before the master piston and the slave piston were brought in contact with each other; and a pad gap securing step of moving the master piston backward until a pad gap between the slave piston and the brake pad corresponds to a second section, when the moving distance of the master piston corresponds to the first section, and ending initialization of the EMB.

The piston gap determination step may include: an additional forward movement step of moving the master piston forward until the brake pad and the brake disk are brought in contact with each other in a state where the in-valve is opened, when it is determined that the brake pad and the brake disk were brought in contact with each other after the master piston and the slave piston were brought in contact with each other; and an oil injection step of moving the master cylinder backward by a distance corresponding to the first section by injecting brake oil through the in-valve, when the brake pad and the brake disk are brought in contact with each other through the additional forward movement step.

The slave piston may be moved by hydraulic pressure which is formed according to the movement of the master piston.

As the master piston has a smaller cross-sectional area than the slave piston, the master piston may have a larger displacement than the slave piston.

As the in-valve is opened, the brake oil may be introduced into the slave piston from the master cylinder.

As the out-valve is opened, the brake oil introduced into the slave piston may be transferred to the accumulator part.

The contact determination step may include determining that the brake pad and the brake disk were brought in contact with each other before the master piston came in contact with the slave piston, when a pressure measured through a pressure sensor connected to a hydraulic pressure chamber is equal to or more than a preset pressure while the master piston is moved forward.

The piston gap determination step may determine that the master piston is brought in contact with the slave piston, when a current of the motor is equal to or more than a preset current while the master piston is moved forward.

The EMB may include an hEMB which brakes a vehicle using the master piston which is moved by the motor and the slave piston which is moved through hydraulic pressure formed by the brake oil introduced into the slave piston according to the movement of the master piston.

DESCRIPTION OF EMBODIMENTS

Figure 1:
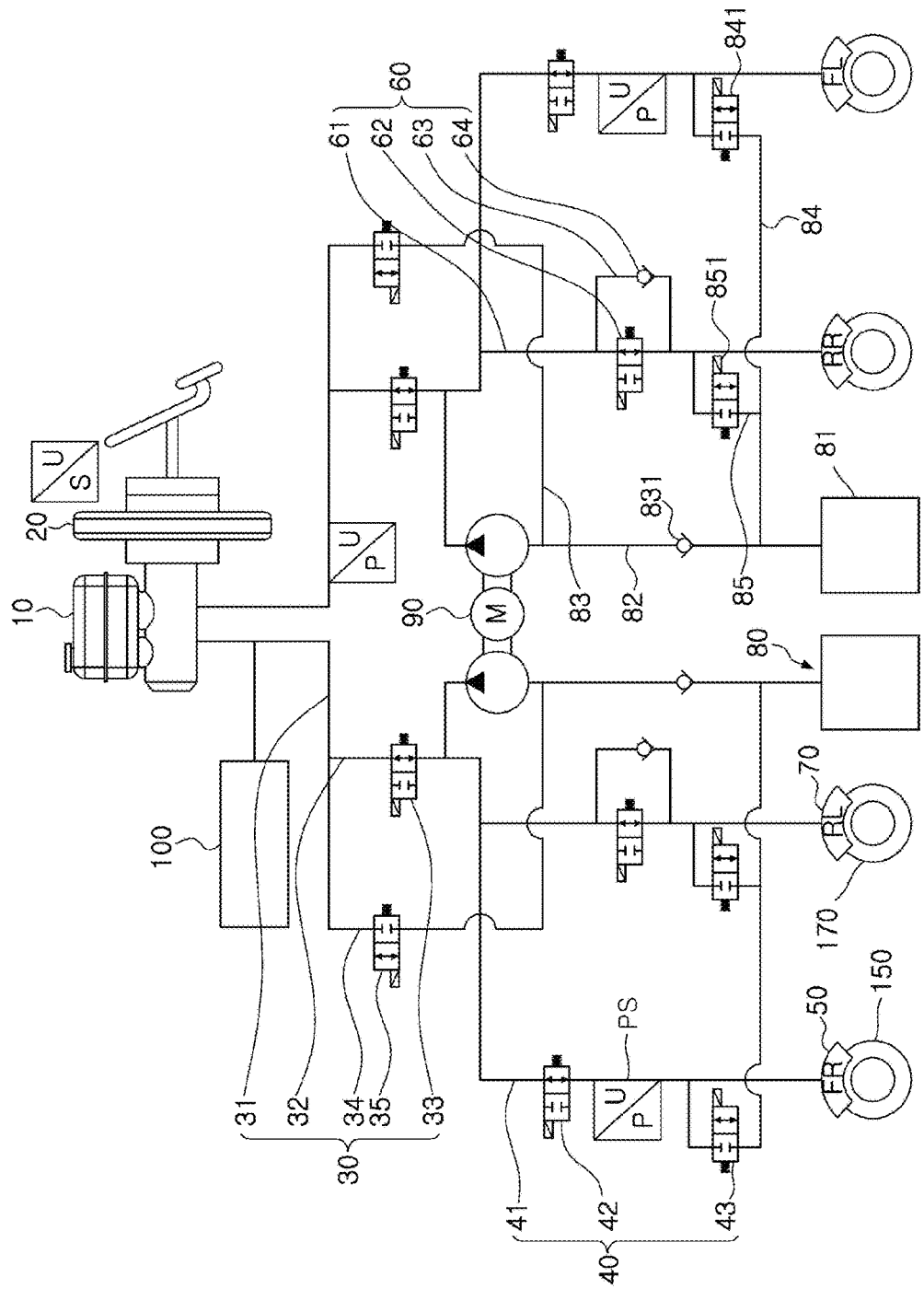
FIG. 1 is a diagram schematically illustrating a brake device for a vehicle in accordance with an embodiment of the present invention.

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

In general, an ESC module is provided to perform ESC control and ABS control for rear wheels when the rear wheels are braked. Depending on cases, however, the ESC module may perform a parking brake function of the front-wheel EMB, a function of blocking a master piston pressure and an EMB wheel pressure during a braking operation, and an EMB initialization function.

In the case of a hydraulic EMB (hEMB) having an ESC module, a pressure generated by a motor is not directly transmitted to a slave piston, but transmitted to the slave piston through a hydraulic pressure formed by pressurizing a master piston. Thus, the hEMB may reduce the generation of noise and the damage of the device.

Furthermore, a boosted force is generated by a difference in cross-sectional area between the master piston and the slave piston. When the boosted force is used, a boosted force generated by a gear may be maximized or removed, which makes it possible to avoid noise and efficiency reduction which can occur when the gear is used. Furthermore, while the number of gear trains is minimized, the size of an actuator can be reduced. Thus, the entire size of the hEMB can be reduced.

The hEMB has a difference in cross-sectional area between the master piston which is driven by the rotational force of the motor and the slave piston which is brought in contact with a brake pad for forming a braking force. Thus, when the pistons are moved, the pistons have a difference in moving speed therebetween.

Thus, the two pistons gradually approach each other. When two pistons come in contact with each other in a braking section where a braking force needs to be generated, the effect of the boosted hydraulic pressure may disappear. In order to prevent the disappearance, an initialization operation for the hEMB may be performed as follows. The master piston and the slave piston may be forced to be spaced at a predetermined gap or more from each other such that the braking performance can be normally performed.

At this time, in order to space the master piston and the slave piston from each other, a solenoid valve may be operated in a state where the master piston and the slave piston are brought in contact with each other. Then, when only the master piston is moved backward in a state where the slave piston is stopped, a predetermined gap is formed between the master piston and the slave piston.

However, when the reverse speed of the master piston is relatively high, the speed at which brake oil is introduced may be lowered to form low hydraulic pressure. Thus, the slave piston is moved backward together, thereby making it difficult to maintain the desired gap between the master piston and the slave piston.

Thus, the reverse speed of the master piston may be lowered to secure a gap. In this case, however, stability may be degraded, and a considerable amount of time may be required for initialization. Thus, there is a demand for an improved structure.

FIG. 1 is a diagram schematically illustrating a brake device for a vehicle in accordance with an embodiment of the present invention. Referring to FIG. 1, the brake device 1 for a vehicle in accordance with the embodiment of the present invention may include a master cylinder 10, a pedal 20, a diverging line part 30, a front wheel line part 40, a hydraulic electro-mechanical brake (hEMB) 50, a rear wheel line part 60, a hydraulic brake 70, an accumulator part 80, a motor pump 90, and a pedal simulator 100.

The master cylinder 10 may be mounted on a vehicle body, and the pedal 20 may pressurize the master cylinder 10. For example, the pedal 20 may be positioned at the bottom of a driver's seat such that a driver can step on the pedal 20. When the pedal 20 pressurizes the master cylinder 10, hydraulic pressure in the master cylinder 10 may be amplified.

The diverging line part 30 may be connected to the master cylinder 10, and transfer hydraulic pressure generated through the master cylinder 10. For example, the master cylinder 10 may have two chambers formed therein, and a pair of diverging line parts 30 may be connected to the respective chambers so as to transfer hydraulic pressure.

The diverging line part 30 may include a diverging supply part 31, a diverging connection part 32, a normal open valve 33, a diverging storage part 34, and a normal closed valve 35.

The pair of diverging supply parts 31 may be connected to the master cylinder 10 so as to transfer hydraulic pressure. In the present embodiment, the pedal simulator 100 may be connected to the diverging supply part 31.

The diverging connection part 32 may have one end connected to the diverging supply part 31 and the other end connected to the front wheel line part 40. The normal open valve 33 may be mounted on the diverging connection part 32, and open the diverging connection part 32 in a state where no electrical signal is received. When receiving an electrical signal, the normal open valve 33 may close the diverging connection part 32.

The diverging storage part 34 may have one end connected to the diverging supply part 31 and the other end connected to the accumulator part 80. The normal closed valve 35 may be mounted on the diverging storage part 34, and close the diverging storage part 34 in a state where no electrical signal is received. When receiving an electrical signal, the normal closed valve 35 may open the diverging storage part 34.

The front wheel line part 40 may be connected to the diverging line part 30 so as to guide hydraulic pressure, and the hEMB 50 may be connected to the front wheel line part 40. The hEMB 50 may mechanically brake a front wheel 150 according to a received electrical signal.

The hEMB 50 may be connected to the front wheel line part 40, and supply hydraulic pressure to the front wheel line part 40 while braking the front wheel 150 according to the electrical signal. In the present embodiment, the hEMB 50 may brake the front wheel 150 using the hydraulic pressure provided through the front wheel line part 40.

At this time, the front wheel line part 40 may include a front wheel guide part 41, an in-valve 42, and an out-valve 43. The front wheel guide part 41 may connect the diverging connection part 32 and the hEMB 50. The in-valve 42 may be mounted on the front wheel guide part 41 and open/close the front wheel guide part 41 according to control, such that the brake oil of the master cylinder 10 is introduced.

In the present embodiment, one end of the front wheel guide part 41 may be connected to the normal open valve 33 formed at an end of the diverging connection part 32, and the other end of the front wheel guide part 41 may be connected to the hEMB 50.

The out-valve 43 may transfer the brake oil introduced from the master cylinder 10 to the accumulator part 80 according to control.

At this time, since the brake oil transferred to the accumulator part 80 has pressure formed therein, the brake oil is free from the surface tension between the master piston P1 and the slave piston P2, unlike the brake oil which is directly introduced from the master cylinder 10.

The front wheel guide part 41 may have a hydraulic pressure sensor mounted therein, the hydraulic pressure sensor measuring hydraulic pressure. During four-wheel independent active control, fluid pressure may leak when the hydraulic pressure between the in-valve 42 and the hEMB 50 becomes higher than the previous hydraulic pressure of the in-valve 42. In order to prevent the leakage, a check valve may be removed from the in-valve 42.

The rear wheel line part 60 may connected to the front wheel line part 40 so as to guide hydraulic pressure, and the hydraulic brake 70 may be connected to the rear wheel line part 60. The hydraulic brake 70 may brake a rear wheel 170 using hydraulic pressure. In the present embodiment, the rear wheel line part 60 may include a rear wheel guide part 61, a rear wheel valve 62, a rear wheel bypass part 63, and a check valve 64.

The rear wheel guide part 61 may connect the front wheel guide part 41 and the hydraulic brake 70, and the rear wheel valve 62 may be mounted on the rear wheel guide part 61 so as to open/close the rear wheel guide part 61. For example, one end of the rear wheel guide part 61 may be connected to the front wheel guide part 41 between the normal open valve 33 and the in-valve 42. The rear wheel bypass part 63 may have both ends connected to the rear wheel guide part 61, and induce hydraulic pressure to bypass the rear wheel valve 62. The check valve 64 may be mounted on the rear wheel bypass part 63 and allow hydraulic pressure to flow only in one direction.

The accumulator part 80 may store hydraulic pressure to perform a buffer function. The accumulator part 80 may be connected to the diverging line part 30, the front wheel line part 40, and the rear wheel line part 60, and adjust hydraulic pressure passing through the diverging line part 30, the front wheel line part 40, and the rear wheel line part 60.

In the present embodiment, the accumulator part 80 may include an accumulator 81, a pump connection part 82, a diverging connection part 83, a front wheel connection part 84, and a rear wheel connection part 85. The pump connection part 82 may connect the motor pump 90 and the accumulator 81, the diverging connection part 83 may connect the diverging storage part 34 and the accumulator 81, the front wheel connection part 84 may connect the front wheel guide part 41 and the accumulator 81, and the rear wheel connection part 85 may connect the rear wheel guide part 61 and the accumulator 81.

The diverging connection part 83 may include a connection check valve 831 which allows hydraulic pressure to flow only in one direction. The front wheel connection part 84 may include a front wheel opening/closing part 841 which opens/closes the front wheel connection part 84, and the rear wheel connection part 85 may include a rear wheel opening/closing part 851 which opens/closes the rear wheel connection part 85.

In the present embodiment, the pump connection part 82 may have one end connected to the motor pump 90 and the other end connected to the accumulator 81. One end of the diverging connection part 83 may be connected to the normal closed valve 35 formed at the end of the diverging storage part 34, and the other end of the diverging connection part 83 may be connected to the pump connection part 82 formed between the motor pump 90 and the connection check valve 831.

One end of the front wheel connection part 84 may be connected to the front wheel guide part 41 formed between the in-valve 42 and the hEMB 50, and the other end of the front wheel connection part 84 may be connected to the pump connection part 82 formed between the connection check valve 831 and the accumulator 81.

One end of the rear wheel connection part 85 may be connected to the rear wheel guide part 61 formed between the rear wheel bypass part 63 and the hydraulic brake 70, and the other end of the rear wheel connection part 85 may be connected to the front wheel connection part 84 formed between the front wheel opening/closing part 841 and the accumulator 81.

The motor pump 90 may be connected to the front wheel line part 40 so as to supply hydraulic pressure. In the present embodiment, the motor pump 90 may be driven according to an electric signal, and provide hydraulic pressure to the hydraulic brake 70.

In the present embodiment, the motor pump 90 may be connected to each of the front wheel guide parts 41. For example, the motor pump 90 may be connected to the front wheel guide part 41 formed between the normal open valve 33 and the in-valve 42.

The pedal simulator 100 may be connected to the diverging line part 30, and provide a pedal force to the pedal 20. Through the pedal simulator 100, a driver may recognize a pedal feel when stepping on the pedal 20.

Figure 2:
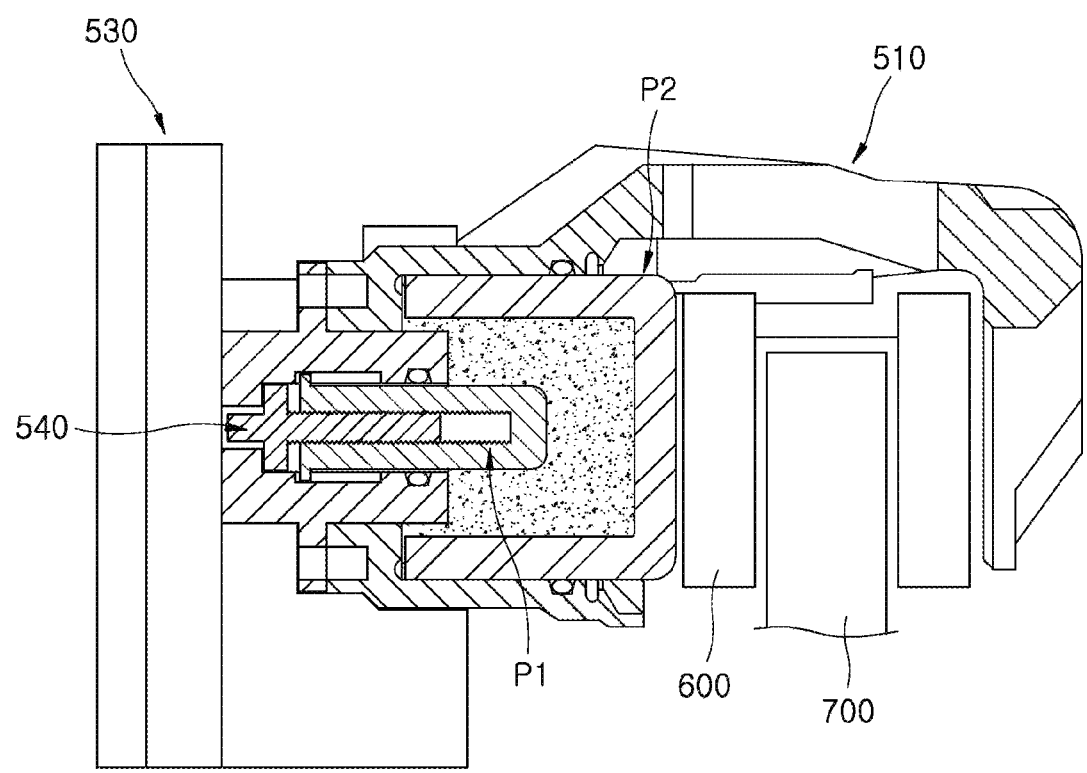
FIG. 2 is a cross-sectional view schematically illustrating an hEMB for a vehicle in accordance with the embodiment of the present invention.
Figure 3:
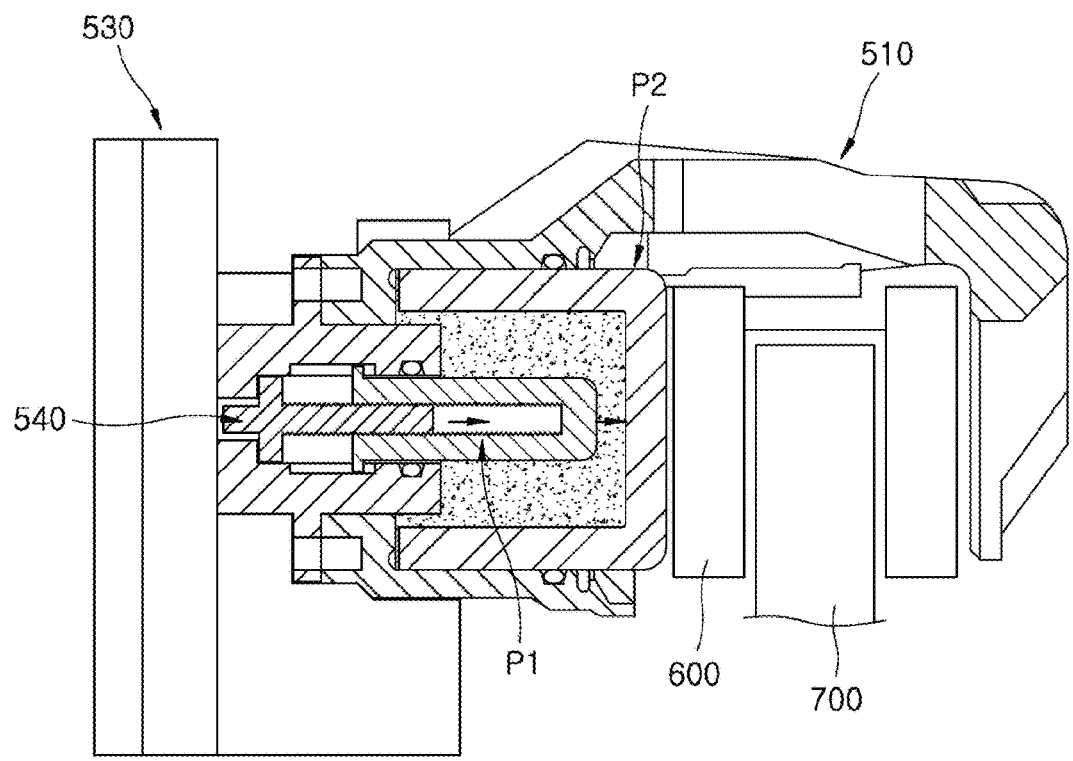
FIG. 3 is a cross-sectional view schematically illustrating the operation of the hEMB in accordance with the embodiment of the present invention.

FIG. 2 is a cross-sectional view schematically illustrating the hEMB for a vehicle in accordance with the embodiment of the present invention. FIG. 3 is a cross-sectional view schematically illustrating the operation of the hEMB in accordance with the embodiment of the present invention.

Referring to FIGS. 2 and 3, the hEMB 50 in accordance with the embodiment of the present invention may include a housing 510, a motor 530, a spindle 540, a master piston P1, and a slave piston P2.

The housing 510 may have a hydraulic pressure chamber formed therein. At one side of the hydraulic pressure chamber, a pair of brake pads 600 may be installed. Between the brake pads 600, a brake disk 700 may be installed. The hydraulic pressure chamber may contain incompressible brake oil serving as working fluid.

The motor 530 may be coupled to the housing 510 through a bolting system or the like, and include an electric motor and a gear. As power is applied, the motor 530 may be driven.

The spindle 540 may be axially coupled to the motor 530 and formed in a cylindrical rod shape. The spindle 540 may be coupled to the master piston P1 through a screw thread formed on the outer circumferential surface thereof.

The master piston P1 may be movably coupled to the spindle 540. In the present embodiment, the master piston P1 may be positioned so as to be spaced from the slave piston P2. When the master piston P1 is reciprocated forward and backward by the rotation of the spindle 540, the master piston P1 may pressurize the brake oil between the master piston P1 and the slave piston P2 so as to pressurize the slave piston P2.

The slave piston P2 may be movably coupled to the hydraulic pressure chamber, and contain brake oil therein. The slave piston P2 may be connected to the brake pad 600. As the slave piston P2 is moved to one side, the brake pad 600 may be brought in contact with the brake disk 700 to form a braking force.

Since the slave piston P2 is pressurized through the brake oil serving as a medium, the master piston P1 and the slave piston P2 may be prevented from coming in contact with each other, which makes it possible to prevent noise and damage of the device.

Furthermore, since the slave piston P2 is pressurized and moved by the pressure of the brake oil, which is formed through the movement of the master piston P1, the pressure of the working fluid may be uniformly applied to the slave piston P2.

Thus, since the slave piston P2 uniformly pressurizes the entire brake pad 600, the substantial friction area between the brake pad 600 and the brake disk 700 can be increased.

The master piston P1 may have a smaller cross-sectional area than the inner cross-sectional area of the slave piston P2. The moving distance of the slave piston P2 may be determined according to the cross-sectional area and the moving distance of the master piston P1.

For example, when the master piston P1 has a diameter of 30 mm and the slave piston P2 has an inner diameter of 60 mm, the cross-sectional area of the slave piston P2 may be four times larger than the cross-sectional area of the master piston P1.

At this time, when the master piston P1 is moved by 4 mm, the slave piston P2 is moved by 1 mm. As a result, the displacement of the master piston P1 becomes larger than the displacement of the slave piston P2. As such, the ratio of the cross-sectional areas of the slave piston P2 and the master piston P1 may be considered to determine the moving distances of the slave piston P2 and the master piston P1.

Figure 4:
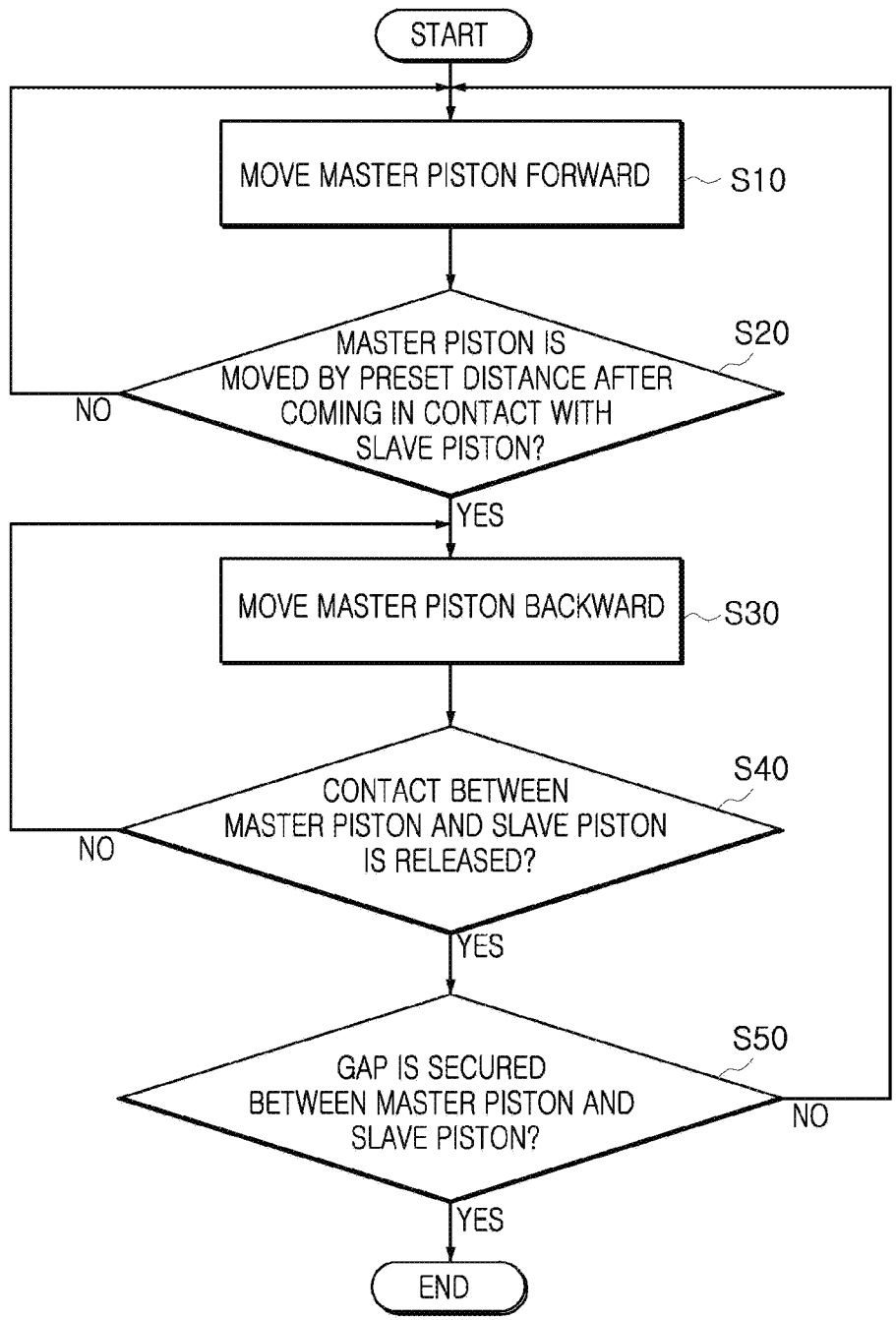
FIG. 4 is a flowchart illustrating an initialization method for an EMB in accordance with a first embodiment of the present invention.

FIG. 4 is a flowchart illustrating an initialization method for an EMB in accordance with a first embodiment of the present invention. Referring to FIG. 4, the initialization method S1 for an EMB in accordance with the first embodiment of the present invention will be described as follows.

An aspect of the present invention relates to a method for initializing an hEMB 50 which brakes a vehicle using a master piston P1 which drives and moves a motor (not illustrated) and a slave piston P2 which is moved through hydraulic pressure formed by brake oil introduced into the slave piston P2 according to the movement of the master piston P1. The initialization method for maintaining a gap between the master piston P1 and the slave piston P2 will be described in detail as follows.

FIGS. 5 to 9 are reference diagrams for describing the transfer of brake oil and the movement of the master piston P1 and the slave pistons P2 when the in-valve 42 and the out-valve 43 are opened and closed. Since the hEMB has substantially the same structure as a general EMB, components such as a caliper body, a gear, a motor, a screw, a nut, a cylinder, and a seal member are not illustrated in FIGS. 5 to 9.

Figure 5:
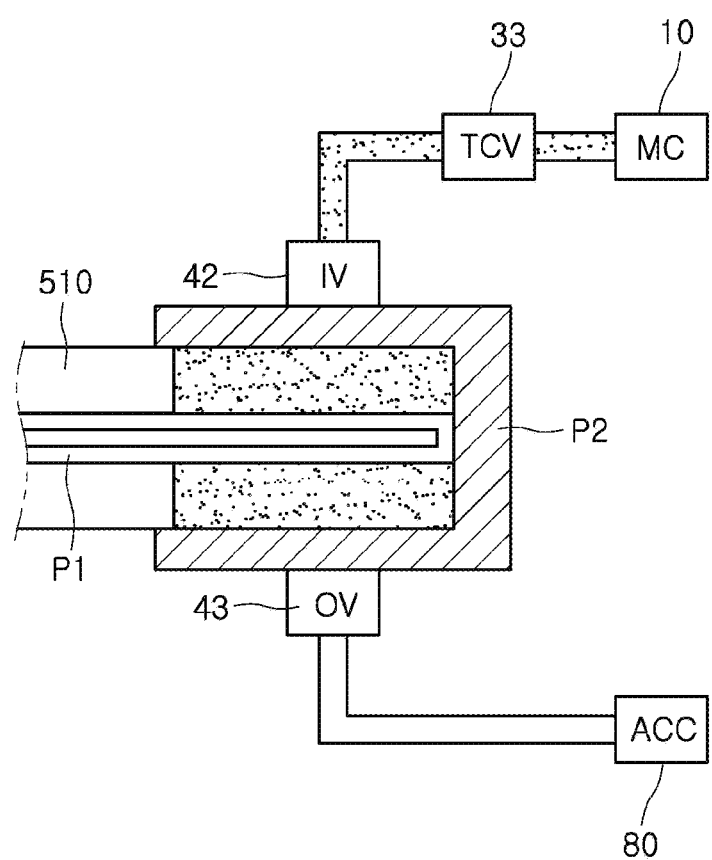
FIG. 5 is a diagram illustrating a state in which an in-valve is opened and an out-valve is closed in the initialization method for an EMB in accordance with the first embodiment of the present invention.

FIG. 5 is a diagram illustrating a state in which the in-valve is opened and the out-valve is closed in the initialization method for an EMB in accordance with the first embodiment of the present invention. Referring to FIG. 5, the in-valve 42 for controlling a flow path through which brake oil is introduced from the master cylinder 10 may be opened, the out-valve 43 for controlling a flow path through which brake oil is transferred to the accumulator part 80 may be closed, and the motor may be driven to move the master piston P1 forward within the housing 510, at step S10. When the motor is driven, a rotational force may be generated to move the master piston P1.

At this time, as the in-valve 42 is opened and the out-valve 43 is closed, the brake oil from the master cylinder 10 may be introduced into the slave piston P2.

More specifically, since a seal member (not illustrated) for sealing the master piston P1, the housing 510, the slave piston P2, and a caliper body (not illustrated) is formed, the brake oil introduced into the slave piston P2 may not leak to outside. As the master piston P1 is moved, hydraulic pressure may be formed in the slave piston P2.

Furthermore, when the motor is driven, the master piston P1 may be moved forward or backward within a guide region formed in the housing 510 according to the rotation direction of the motor. The slave piston P2 may be moved forward or backward by the hydraulic pressure which is formed through the movement of the master piston P1.

Figure 6:
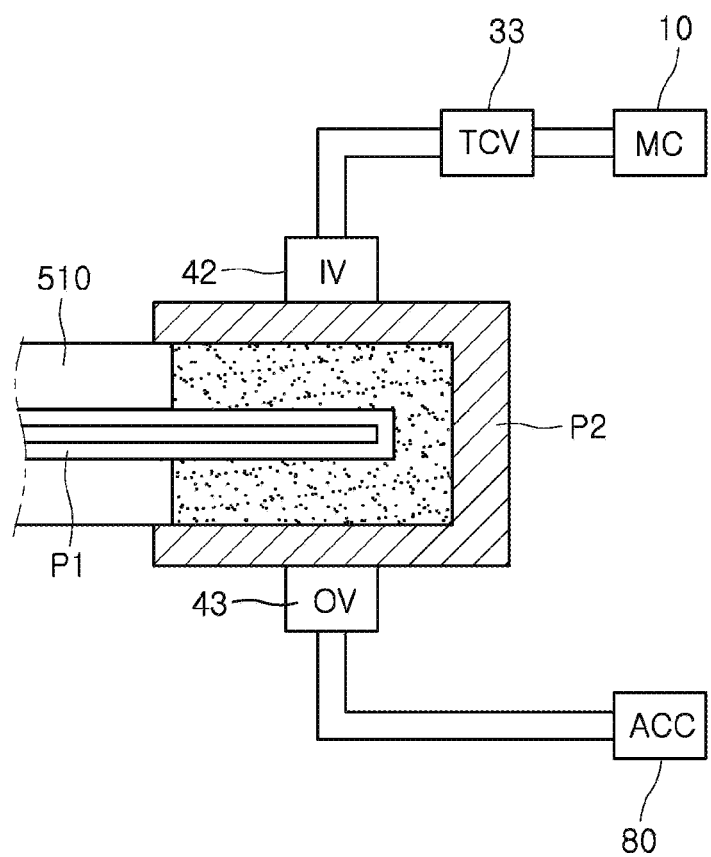
FIG. 6 is a diagram illustrating that a master piston is moved backward in a state where the in-valve and the out-valve are closed in the initialization method for an EMB in accordance with the first embodiment of the present invention.

FIG. 6 is a diagram illustrating that the master piston is moved backward in a state where the in-valve and the out-valve are closed in the initialization method for an EMB in accordance with the first embodiment of the present invention.

When the master piston P1 is moved by a preset distance after coming in contact with the slave piston P2 which is brought in contact with an inner pad for forming a braking force at step S20, the in-valve 42 may be closed and the motor may be driven to move the master piston P1 backward as illustrated in FIG. 6, at step S30.

When the master piston P1 is moved forward, a current change of the motor may be measured to determine whether the master piston P1 was brought in contact with the slave piston P2. More specifically, when a current measured during operation of the motor is equal to or more than a preset current, a control unit may determine that the master piston P1 was brought in contact with the slave piston P2.

Furthermore, the reason that the master piston P1 is further moved by the preset distance after coming in contact with the slave piston P2 may be described as follows. When the master piston P1 is moved only until the master piston P1 is brought in contact with the slave piston P2, the brake oil introduced into the slave piston P2 may escape toward the master cylinder 10, because the master piston P1 has a smaller cross-sectional area than the slave piston P2. Thus, in order to prevent the escape of the brake oil, the master piston P1 may be further moved by the preset distance after coming in contact with the slave piston P2.

Furthermore, since the master piston P1 has a smaller cross-sectional area than the slave piston P2, the displacement of the master piston P1 is larger than that of the slave piston P2.

Thus, the master piston P1 may be moved forward and backward at higher speed than the slave piston P2.

That is, when the master piston P1 is moved backward, the master piston P1 may be moved backward at higher speed than the slave piston P2. Thus, a gap may be formed between the master piston P1 and the slave piston P2.

When the contact between the master piston P1 and the slave piston P2 is released at step S40 as the master piston P1 is moved backward at step S30, the control unit may determine whether the gap between the master piston P1 and the slave piston P2 is equal to or more than a preset gap. When it is determined that the gap is equal to or more than the preset gap, the control unit may end the initialization for the hEMB 50 at step S50.

At this time, the control unit may determine whether the gap between the master piston P1 and the slave piston P2 is equal to or more than the preset gap by referring to the moving distance of the master piston P1 and the displacement of the slave piston P2 which is moved through the hydraulic pressure formed by the brake oil introduced into the slave piston P2. Alternatively, the control unit may determine whether the gap between the master piston P1 and the slave piston P2 is equal to or more than the preset gap, through position sensors (not illustrated) installed on the master piston P1 and the slave piston P2, respectively.

As such, the hEMB 50 may be initialized through the gap secured between the master piston P1 and the slave piston P2.

Only through steps S10 to S40, the gap can be secured to perform initialization for the hEMB 50. However, when the displacement of the master piston P1 which needs to be moved at step S10 in order to secure a sufficient gap becomes excessive, the current consumption of the motor may be increased. Thus, in the initialization method for an EMB in accordance with the first embodiment of the present invention, when the gap between the master piston P1 and the slave piston P2 is less than the preset gap, the above-described process from step S10 to step S40 may be repeated until the gap becomes equal to or more than the preset gap.

Therefore, current consumption can be reduced and a sufficient gap between the master piston P1 and the slave piston P2 can be secured to stably initialize the EMB.

Figure 7:
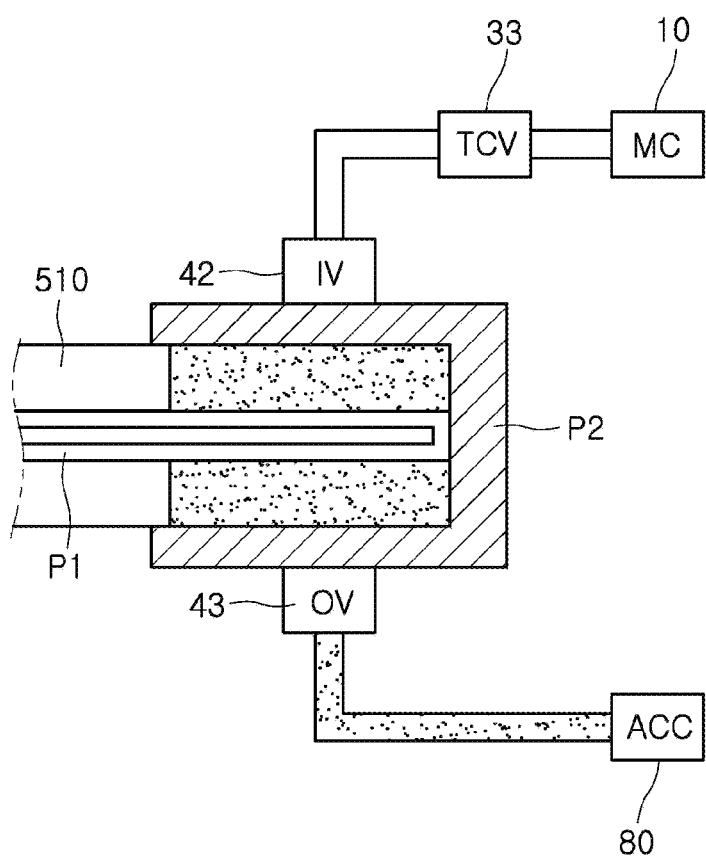
FIG. 7 is a diagram illustrating that the master piston is moved forward in a state where the out-valve is opened in the initialization method for an EMB in accordance with the first embodiment of the present invention.

FIG. 7 is a diagram illustrating that the master piston is moved forward in a state where the out-valve is opened in the initialization method for an EMB in accordance with the first embodiment of the present invention.

When it is determined at step S50 that the gap between the master piston P1 and the slave piston P2 is less than the preset gap, the out-valve 43 may be opened and the master piston P1 may be moved forward until the master piston P1 is brought in contact with the slave piston P2, as illustrated in FIG. 7.

That is, when it is determined at step S50 that the gap is less than the preset gap, the out-valve 43 may be opened and the master piston P1 may be moved forward until the master piston P1 is brought in contact with the slave piston P2, as illustrated in FIG. 5.

Furthermore, as the out-valve 43 is opened, the brake oil introduced from the master cylinder 10 may be transferred to the accumulator part 80.

Figure 8:
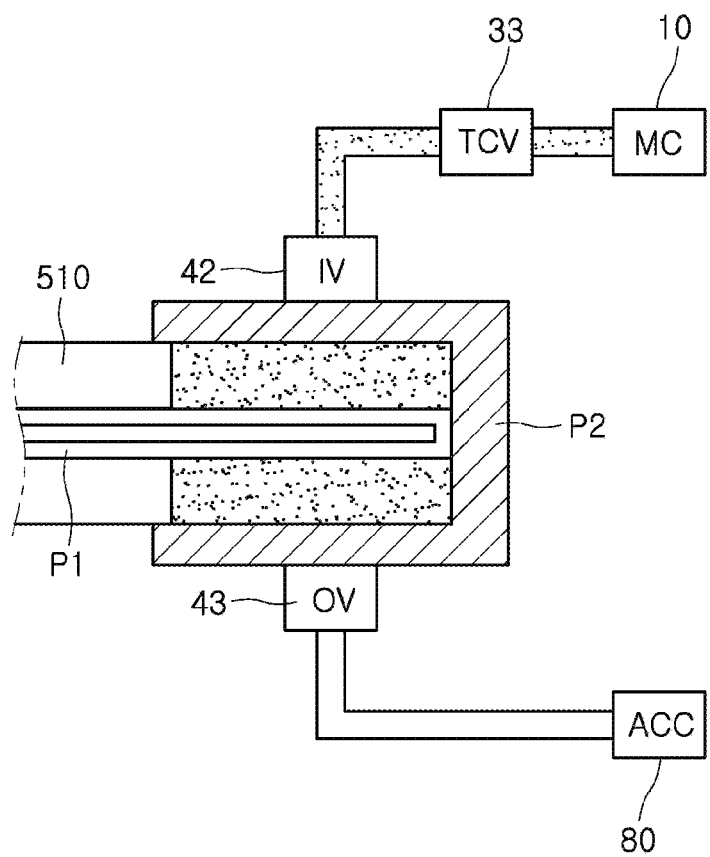
FIG. 8 is a diagram illustrating that the master piston is moved forward in a state where the in-valve is opened and the out-valve is closed, in the initialization method for an EMB in accordance with the first embodiment of the present invention.

FIG. 8 is a diagram illustrating that the master piston is moved forward in a state where the in-valve is opened and the out-valve is closed, in the initialization method for an EMB in accordance with the first embodiment of the present invention.

When the master piston P1 is moved forward to come in contact with the slave piston P2, the in-valve 42 may be opened, the out-valve 43 may be closed, and the motor may be driven to move the master piston P1 forward by a preset distance, as illustrated in FIG. 8.

At this time, as the in-valve 42 is opened and the out-valve 43 is closed, brake oil may be additionally introduced from the master cylinder 10.

Figure 9:
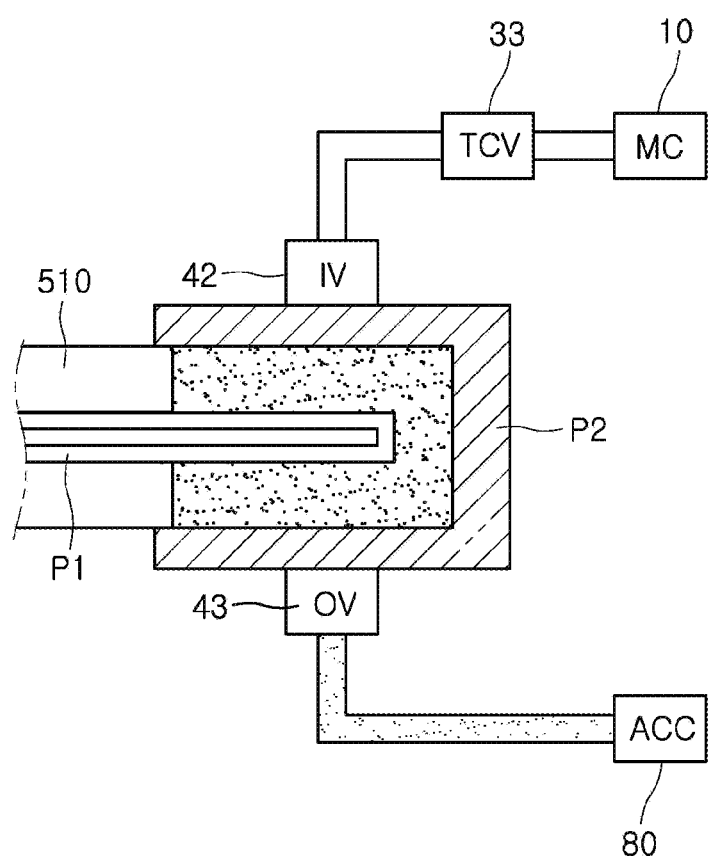
FIG. 9 is a diagram illustrating that the master piston is moved backward in a state where the in-valve is closed and the out-valve is opened, in the initialization method for an EMB in accordance with the first embodiment of the present invention.

FIG. 9 is a diagram illustrating that the master piston is moved backward in a state where the in-valve is closed and the out-valve is opened, in the initialization method for an EMB in accordance with the first embodiment of the present invention.

When the master piston P1 is moved by the preset distance after coming in contact with the slave piston P2, the in-valve 42 may be closed, the out-valve may be opened, and the motor may be driven to move the master piston P1 backward, as illustrated in FIG. 9.

As the out-valve 43 is opened, brake oil which is additionally introduced from the master cylinder 10 may be transferred to the accumulator part 80. Then, when the contact between the master piston P1 and the slave piston P2 is released as the master piston P1 is moved backward, the control unit may determine whether the gap between the master piston P1 and the slave piston P2 is equal to or more than a preset gap. When the gap is equal to or more than the preset gap, the initialization may be ended.

At this time, since the brake oil transferred to the accumulator part 80 has pressure formed therein, the brake oil is free from the surface tension between the master piston P1 and the slave piston P2, unlike the brake oil which is directly introduced from the master cylinder 10.

Furthermore, in the initialization method for an EMB in accordance with the first embodiment of the present invention, the master piston P1 and the slave piston P2 may be forced to be moved even while brake oil is introduced from the master cylinder 10. Thus, the EMB may be stably initialized because another behavior is unlikely to occur.

That is, as the gap between the master piston and the slave piston of the hEMB is secured through the initialization, the initialization method can sufficiently secure the degree of freedom for active control and the degree of freedom for pedal feel tuning as a BBW (Brake By Wire) system.

As described above, the initialization method for an EMB in accordance with the first embodiment of the present invention may secure a gap between the master piston and the slave piston in the hEMB which pressurizes the slave piston in contact with the inner pad using hydraulic pressure, using the pressure of the master piston which is driven by the motor, thereby maximizing the effect of the boosted hydraulic pressure in a braking section.

Figure 10:
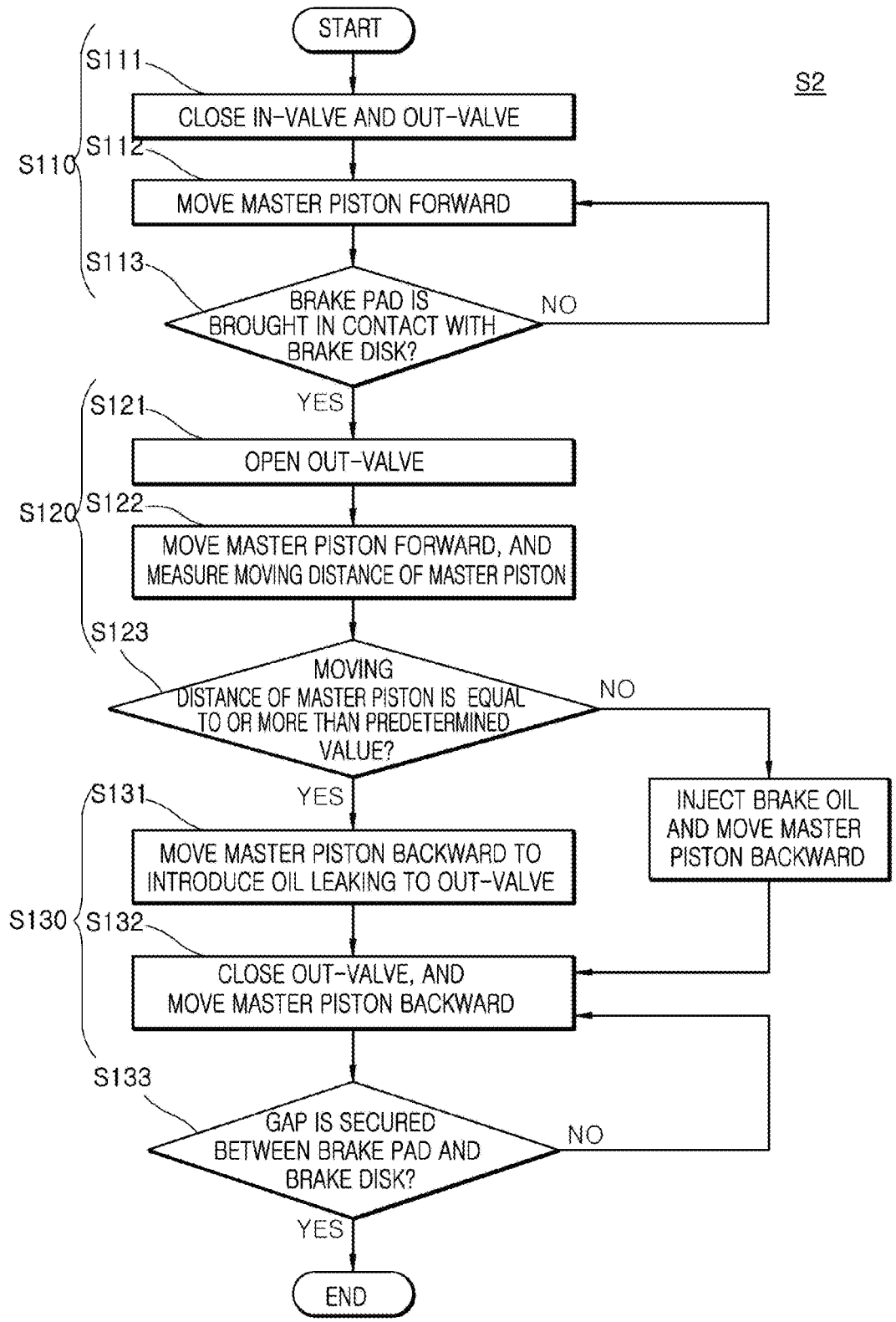
FIG. 10 is a flowchart illustrating an initialization method for an EMB in accordance with a second embodiment of the present invention.

FIG. 10 is a flowchart illustrating an initialization method for an EMB in accordance with a second embodiment of the present invention. Referring to FIG. 10, the initialization method for an EMB in accordance with the second embodiment of the present invention will be described as follows.

The initialization method S2 for an EMB in accordance with the second embodiment of the present invention may include a contact determination step S110, a piston gap determination step S120, and a pad gap securing step S130.

At the contact determination step S110, the control unit may determine whether the master piston P1 and the slave piston P2 come in contact with each other before the brake pad 600 and the brake disk 700 come in contact with each other, when the master piston P1 is moved forward.

Figure 11:
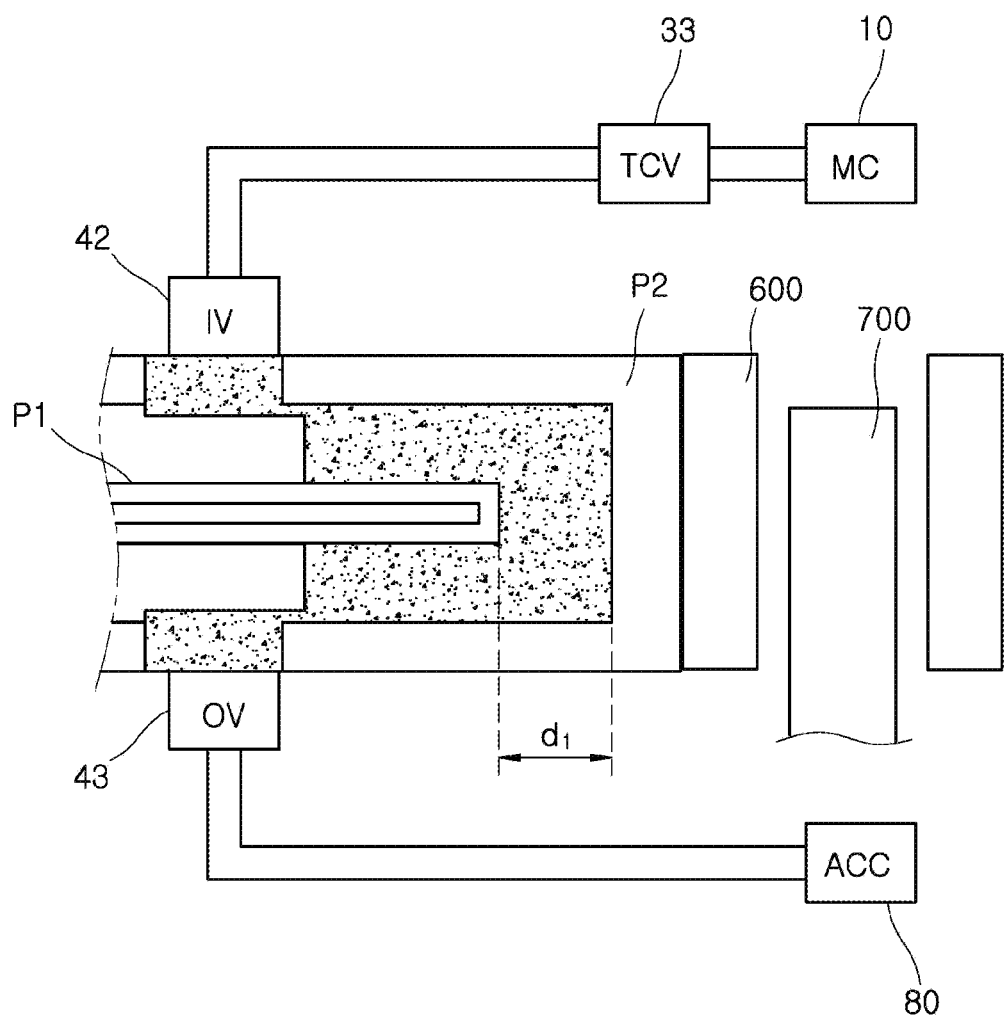
FIG. 11 is a conceptual view for describing the operation of an hEMB in the initialization method for an EMB in accordance with the second embodiment of the present invention.
Figure 12:
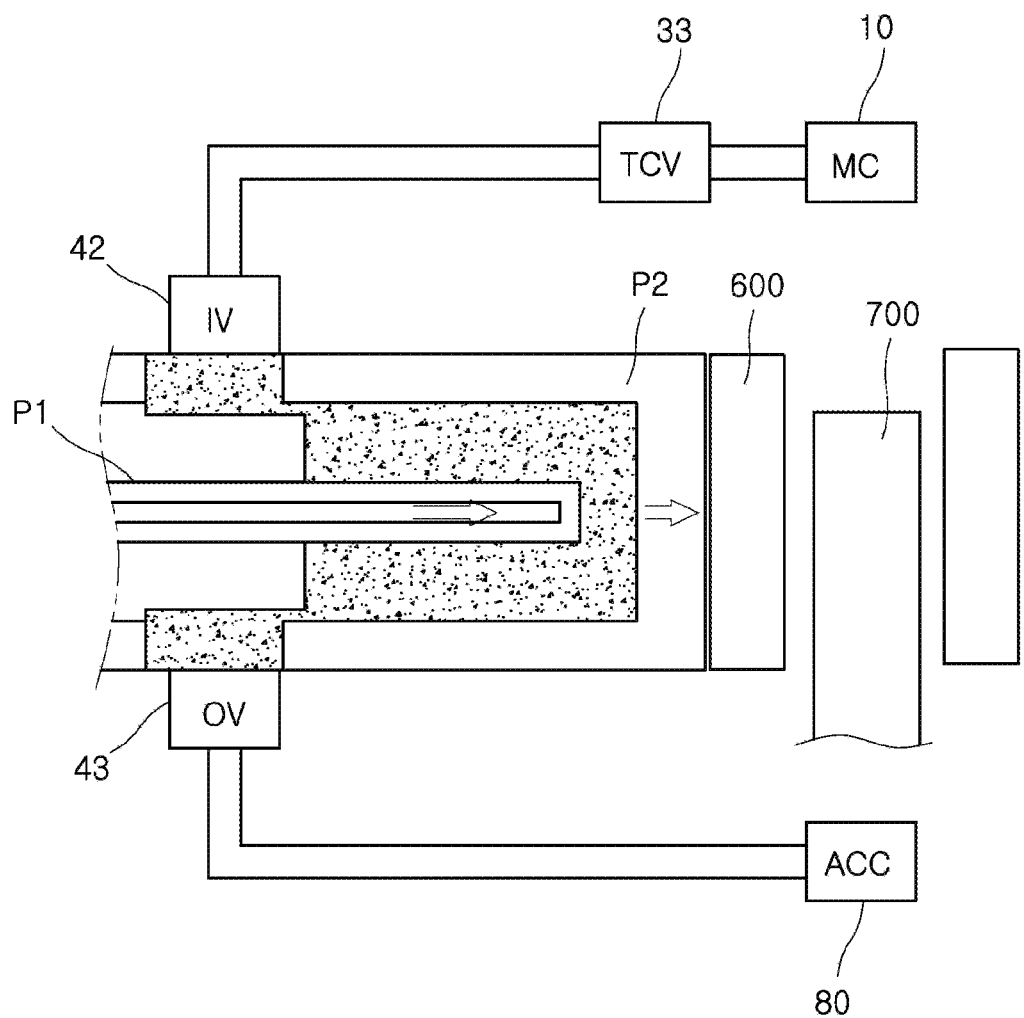
FIG. 12 is a conceptual view illustrating that a master piston and a slave piston of the hEMB are moved forward in the initialization method for an EMB in accordance with the second embodiment of the present invention.

FIG. 11 is a conceptual view for describing the operation of the hEMB in the initialization method for an EMB in accordance with the second embodiment of the present invention. FIG. 12 is a conceptual view illustrating that the master piston and the slave piston of the hEMB are moved forward in the initialization method for an EMB in accordance with the second embodiment of the present invention.

Referring to FIGS. 11 and 12, the motor 530 may be rotated to move the master piston P1 forward, in a state where the in-valve 42 for controlling entry and exit of brake oil to and from the master cylinder 10 is closed and the out-valve 43 for controlling entry and exit of brake oil to and from the accumulator part 80 is closed, at steps S111 and S112.

Since the master piston P1 is moved forward in a state where the entry and exit of brake oil through the in-valve 42 and the out-valve 43 is not performed, the slave piston P2 may be moved forward by the increase in pressure of the brake oil housed between the master piston P1 and the slave piston P2.

Since the master piston P1 has a smaller cross-sectional area than the slave piston P2, the moving distance of the master piston P1 is larger than the moving distance of the slave piston P2.

Figure 13:
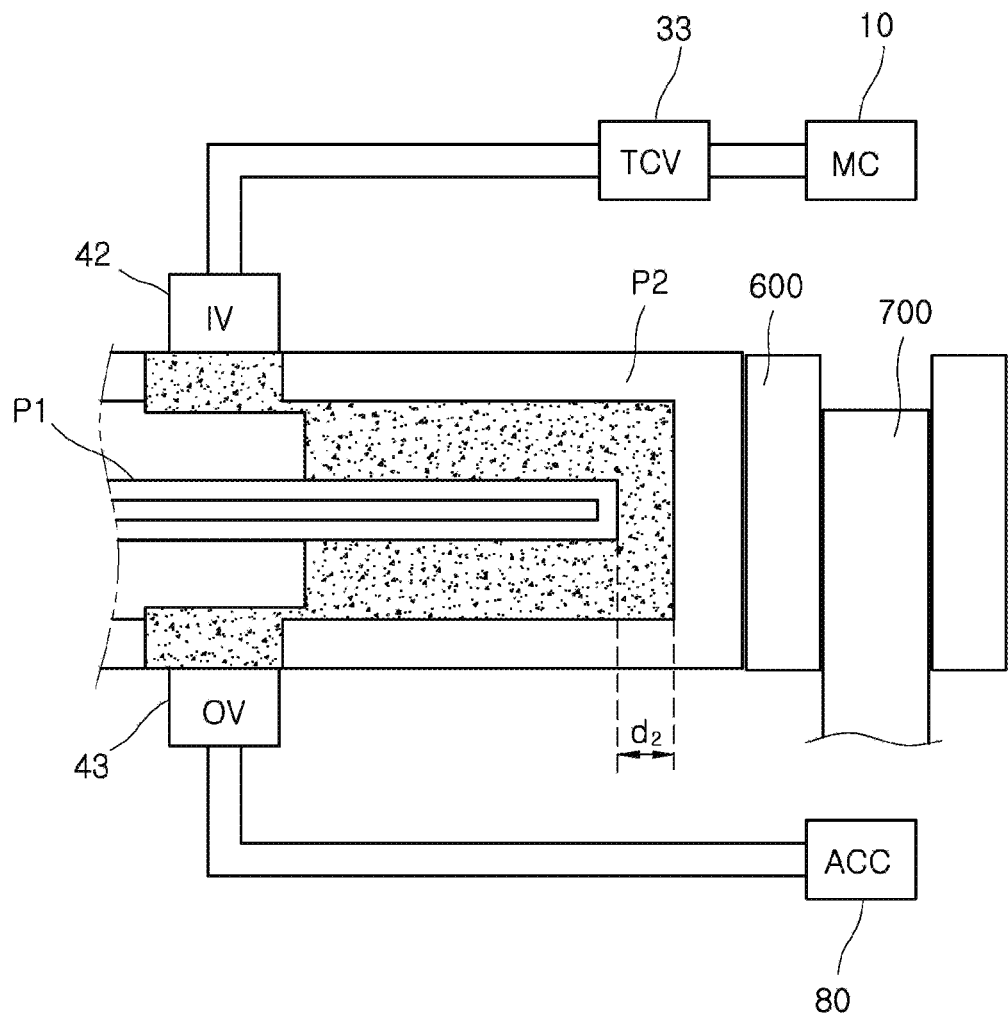
FIG. 13 is a diagram illustrating a state in which a brake pad and a brake disk are brought in contact with each other by the slave piston of the hEMB, in the initialization method for an EMB in accordance with the second embodiment of the present invention.

FIG. 13 is a diagram illustrating a state in which the brake pad and the brake disk are brought in contact with each other by the slave piston of the hEMB, in the initialization method for an EMB in accordance with the second embodiment of the present invention.

Referring to FIG. 13, when a gap between the master piston P1 and the slave piston P2 is secured, the movement of the master piston P1 may be stopped as the brake pad 600 moving with the slave piston P2 comes in contact with the brake disk 700, before the master piston P1 comes in contact with the slave piston P2.

Figure 14:
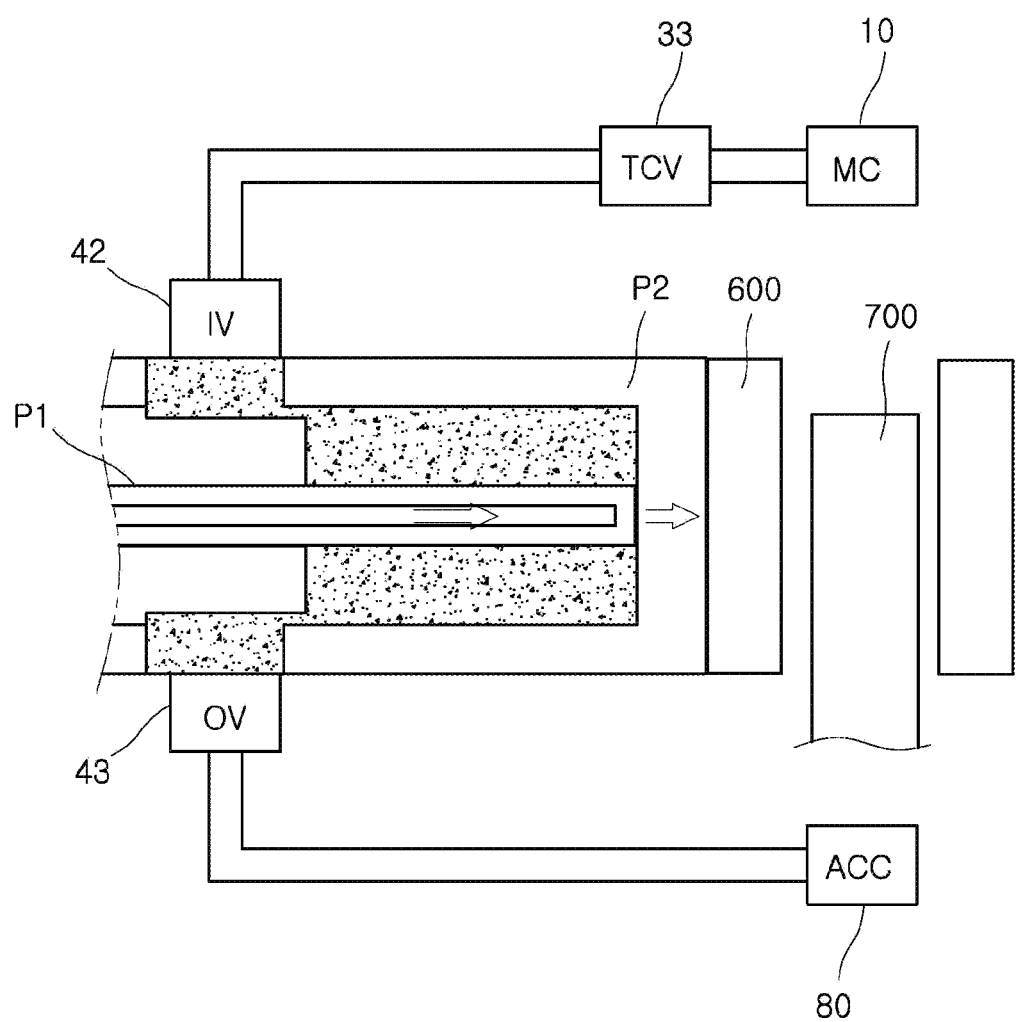
FIG. 14 is a conceptual view illustrating a state in which the master piston and the slave piston of the hEMB are brought in contact with each other while being moved forward, in the initialization method for an EMB in accordance with the second embodiment of the present invention.

FIG. 14 is a conceptual view illustrating a state in which the master piston and the slave piston of the hEMB are brought in contact with each other while being moved forward, in the initialization method for an EMB in accordance with the second embodiment of the present invention.

Referring to FIG. 14, when a sufficient gap between the master piston P1 and the slave piston P2 is not secured, the master piston P1 may come in contact with the slave piston P2 before the brake pad 600 comes in contact with the brake disk 700.

In the second embodiment of the present invention, when the pressure of a pressure sensor PS connected to the hydraulic pressure chamber corresponds to a preset pressure or more, the control unit may determine that the brake pad 600 and the brake disk 700 are brought in contact with each other, before the master piston P1 is brought in contact with the slave piston P2.

That is, when the brake pad 600 attached to the slave piston P2 comes in contact with the brake disk 700 as the master piston P1 is moved forward, the movement of the slave piston P2 may be limited.

When the master piston P1 is moved forward in a state where the slave piston P2 is not moved forward, the pressure of the brake oil as incompressible fluid may be increased. Thus, the control unit may determine whether the pressure measured through the pressure sensor PS is equal to or more than the preset pressure, and determine whether the brake pad 600 is brought in contact with the brake disk 700 as the master piston P1 is moved forward, at step S113.

On the other hand, when the master piston P1 and the slave piston P2 are brought in contact with each other before the brake pad 600 comes in contact with the brake disk 700, the pressure may not reach the preset pressure.

When the master piston P1 and the slave piston P2 are first brought in contact with each other while the slave piston P2 is moved as the master piston P1 is moved forward, the master piston P1 and the slave piston P2 may be moved at the same speed.

When the master piston P1 having a smaller cross-sectional area than the inner cross-sectional area of the slave piston P2 is moved at the same speed as the slave piston P2, the pressure may be reduced while the internal volume of the hydraulic pressure chamber containing brake oil expands.

Thus, depending on whether the value measured through the pressure sensor PS reached the preset value, the control unit may determine whether the master piston P1 and the slave piston P2 are brought in contact with each other as the master piston P1 is moved forward.

In the second embodiment of the present invention, as a sufficient gap is secured between the master piston P1 and the slave piston P2, the brake pad 600 may be brought in contact with the brake disk 700 so as to form a braking force, before the master piston P1 comes in contact with the slave piston P2 when being moved forward.

At the piston gap determination step S120, the control unit may determine whether a piston gap between the master piston P1 and the slave piston P2 corresponds to a first section.

When it is determined at the contact determination step S110 that the brake pad 600 and the brake disk 700 were brought in contact with each other before the master piston P1 and the slave piston P2 were brought in contact with each other, the master piston P1 may be moved forward in a state where the out-valve 43 is opened at step S121. In this state, the control unit may determine whether a moving distance required until the master piston P1 comes in contact with the slave piston P2 corresponds to the first section, at steps S122 and S123.

Figure 15:
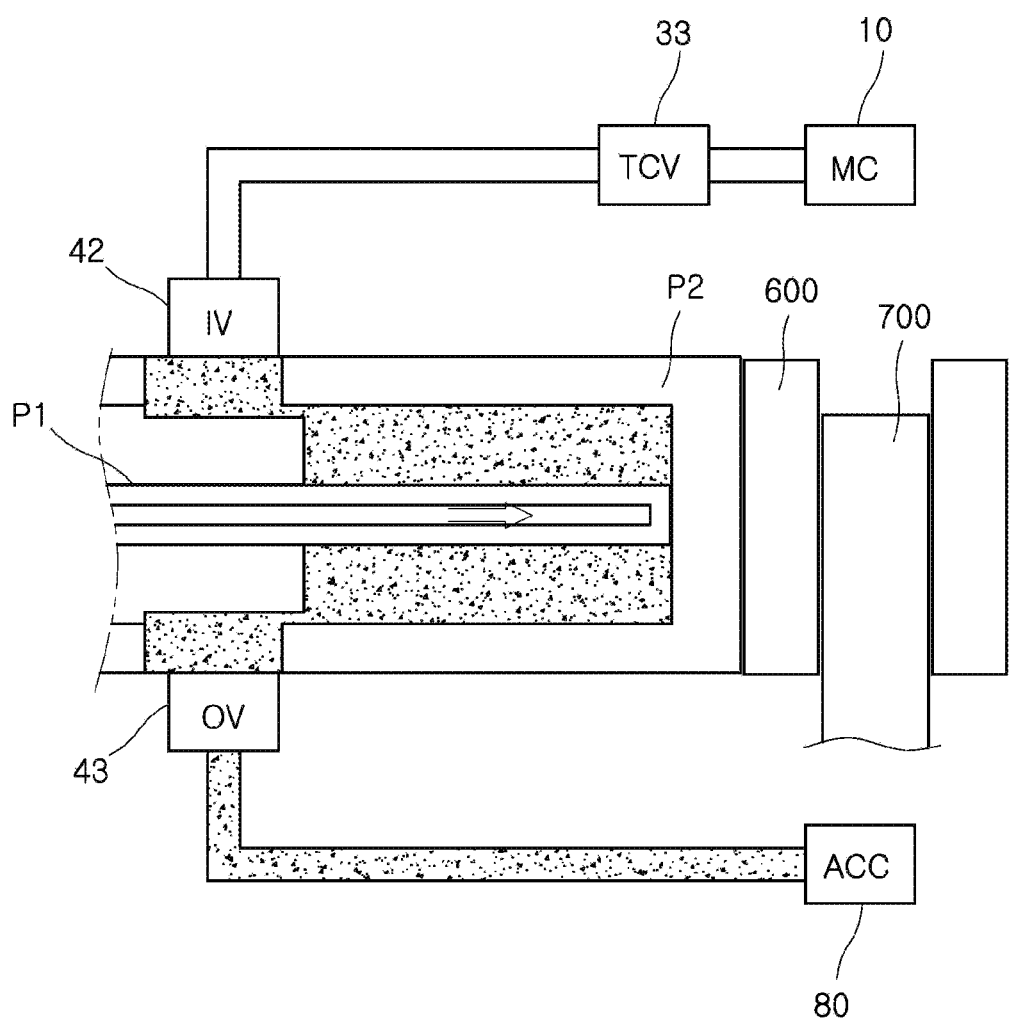
FIG. 15 is a conceptual view illustrating a state in which the master piston and the slave piston of the hEMB are brought in contact with each other, in the initialization method for an EMB in accordance with the second embodiment of the present invention.

FIG. 15 is a conceptual view illustrating a state in which the master piston and the slave piston of the hEMB are brought in contact with each other, in the initialization method for an EMB in accordance with the second embodiment of the present invention.

Referring to FIG. 15, the master piston P1 be moved forward in a state where the out-valve 43 is opened and the forward movement of the slave piston P2 is limited by the brake pad 600. Thus, as the master piston P1 is moved forward, the brake oil may be transferred to the accumulator part 80 through the out-valve 43.

The master piston P1 may be moved forward to come in contact with the slave piston P2. The control unit may determine whether the master piston P1 comes in contact with the slave piston P2, through a current sensor mounted on the motor 530 which moves the master piston P1.

When the pressure applied to the master piston P1 is changed, the load applied to the motor 530 may be varied. Thus, the control unit may measure whether a current measured during operation of the motor 530 is equal to or more than a preset current, in order to determine whether the master piston P1 came in contact with the slave piston P2.

Since the master piston P1 is moved forward in a state where the slave piston P2 is stopped, the moving distance of the master piston P1 may correspond to the moving distance of the slave piston P2 before the master piston P1 is moved. The control unit may determine whether a value obtained by measuring the moving distance of the master piston P1 corresponds to the first section.

The first section may indicate a gap required between the master piston P1 and the slave piston P2 in a state where the movement of the slave piston P2 is limited by the contact between the brake pad 600 and the brake disk 700, and correspond to a section which is previously set by considering brake oil, the device size, a braking force, abrasion of the brake pad 600 or the like.

Figure 16:
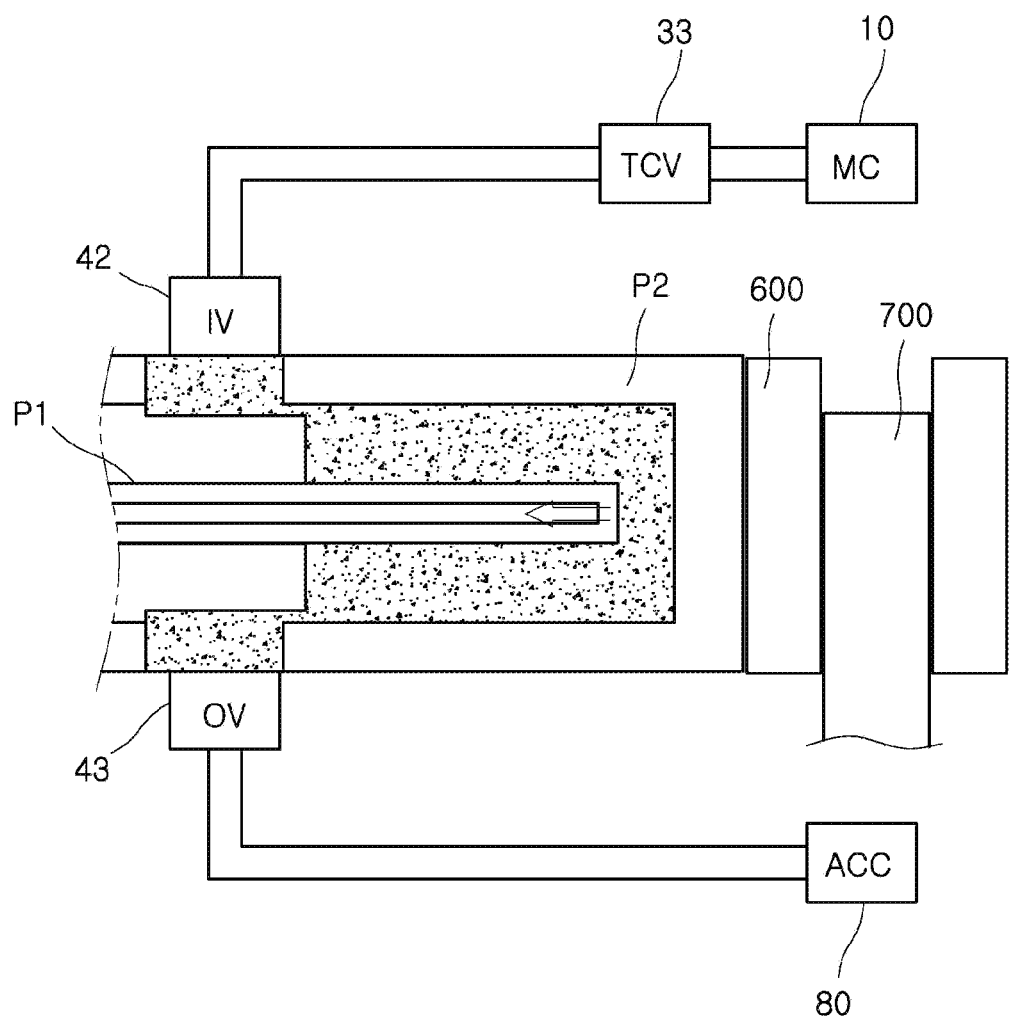
FIG. 16 is a conceptual view illustrating a state in which the master piston is moved backward in order to secure a gap between the master piston and the slave piston of the hEMB, in the initialization method for an EMB in accordance with the second embodiment of the present invention.

FIG. 16 is a conceptual view illustrating a state in which the master piston is moved backward in order to secure a gap between the master piston and the slave piston of the hEMB, in the initialization method for an EMB in accordance with the second embodiment of the present invention.

Referring to FIG. 16, when the master piston P1 is moved backward in a state where the out-valve 43 is opened, the brake oil transferred to the accumulator part 80 may be introduced into the hydraulic pressure chamber.

In the second embodiment, the piston gap determination step S120 may include an additional forward movement step and an oil injection step. At the additional forward movement step, when it is determined that the brake pad 600 and the brake disk 700 were brought in contact with each other after the master piston P1 and the slave piston P2 were brought in contact with each other, the master piston P1 may be moved forward until the brake pad 600 and the brake disk 700 come in contact with each other in a state where the in-valve 42 is opened.

After the additional forward movement step, the state in which the master piston P1 and the slave piston P2 are brought in contact with each other may be switched to the state in which the brake pad 600 and the brake disk 700 are brought in contact with each other. Then, the brake oil may be injected to secure a gap between the master piston P1 and the slave piston P2.

At the oil injection step, when the brake pad 600 and the brake disk 700 are brought in contact with each other through the additional forward movement step, the master piston P1 may be moved backward by a distance corresponding to the first section while brake oil is injected through the in-valve 42.

Specifically, at the oil injection step, the in-valve 42 and the normal closed valve 35 may be opened in a state where the out-valve 43 and the normal open valve 33 are closed, and the master piston P1 may be moved forward while the motor pump 90 is operated to inject the brake oil of the master cylinder 10 into the hydraulic pressure chamber.

Figure 17:
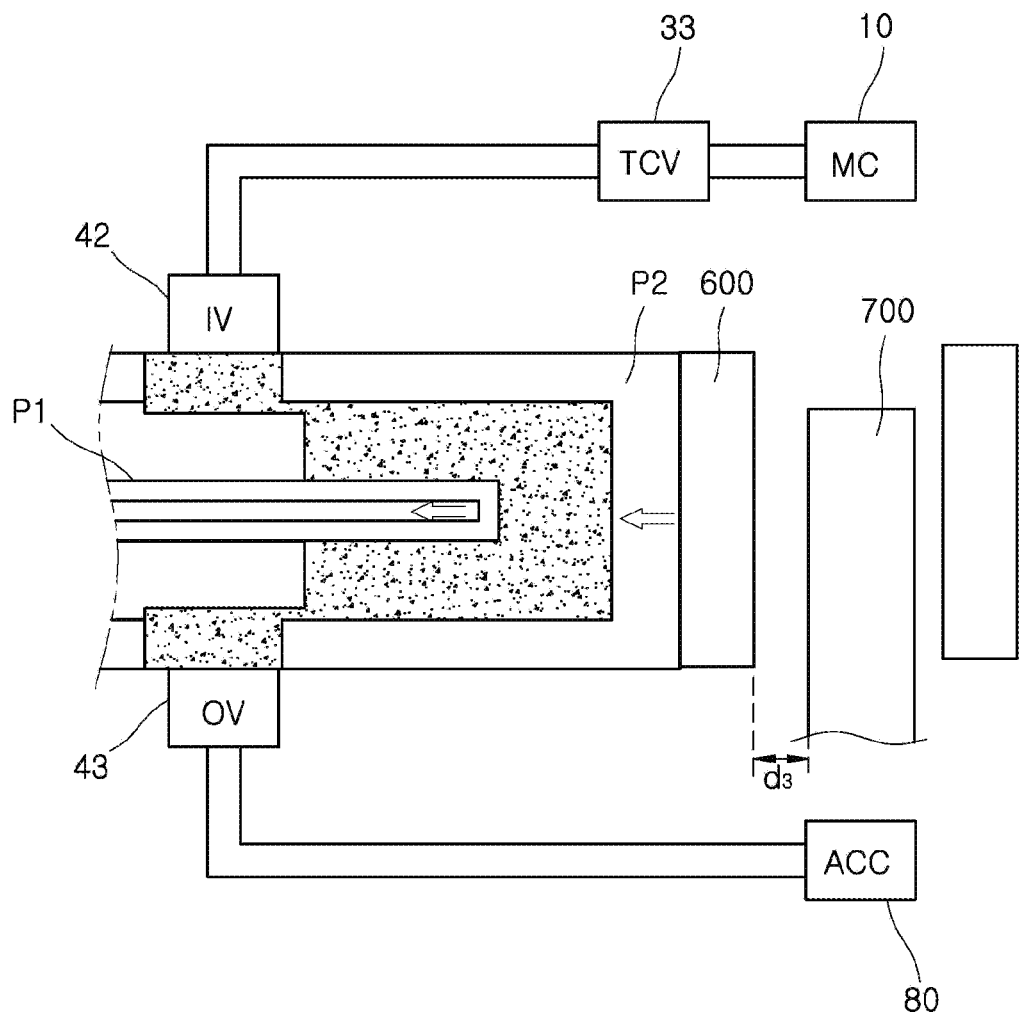
FIG. 17 is a conceptual view illustrating a state in which the master piston and the slave piston of the hEMB are moved backward to secure a gap from the brake pad, in the initialization method for an EMB in accordance with the second embodiment of the present invention.

FIG. 17 is a conceptual view illustrating a state in which the master piston and the slave piston of the hEMB are moved backward to secure a gap from the brake pad, in the initialization method for an EMB in accordance with the second embodiment of the present invention.

Referring to FIG. 17, when the moving distance of the master piston P1 corresponds to the first section at the pad gap securing step S130, the master piston P1 may be moved backward until the pad gap between the slave piston P2 and the brake pad 600 corresponds to a second section. Then, the initialization of the hEMB 50 may be ended.

When the moving distance of the master piston P1 corresponds to the first section, it may indicate that a sufficient gap is secured between the master piston P1 and the slave piston P2. Thus, the master piston P1 may be moved backward to introduce the brake oil leaking to the accumulator part 80 into the hydraulic pressure chamber in a state where the out-valve 43 is opened, at step S131.

When the brake oil is introduced into the hydraulic pressure chamber, the master piston P1 may be moved backward after the out-valve 43 is closed. Since the master piston P1 is moved backward in a state where the in-valve 42 and the out-valve 43 are closed, the slave piston P2 may be moved backward in connection with the movement of the master piston P1, at step S132.

Based on the moving distance of the master piston P1 and the ratio of the cross-sectional areas of the master piston P1 and the slave piston P2, the moving distances of the slave piston P2 and the brake pad 600 may be calculated. The master piston P1 may be moved backward until the moving distance of the slave piston P2 corresponds to less than the second section. Then, the initialization may be ended.

The initialization method for an EMB in accordance with the second embodiment of the present invention may secure a gap between the master piston P1 and the slave piston P2 in the hEMB 50 which pressurizes the slave piston P2 brought in contact with the brake pad 600 using hydraulic pressure, using the pressure of the master piston P1 driven by the motor 530, thereby maximizing the effect of boosted hydraulic pressure in a braking section.

Furthermore, as the gap between the master piston and the slave piston of the hEMB is secured through the initialization, the initialization method can sufficiently secure the degree of freedom for active control and the degree of freedom for pedal feel tuning as a BBW (Brake By Wire) system.

Furthermore, the initialization method may complete the initialization operation for the EMB through one reciprocation of the master piston P1. Thus, the initialization process can be simply and rapidly performed.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An initialization method for an electro mechanical brake (EMB), comprising:
    opening an in-valve for controlling a flow path through which brake oil is introduced from a master cylinder, closing an out-valve for controlling a flow path through which the brake oil is transferred to an accumulator part, and driving a motor to move a master piston forward;
    when the master piston is moved by a preset distance after coming in contact with a slave piston which is brought in contact with an inner pad for forming a braking force, closing the in-valve and driving the motor to move the master piston backward;
    when the contact between the master piston and the slave piston is released, determining whether a gap between the master piston and the slave piston is equal to or more than a preset gap; and
    when the gap is equal to or more than the preset gap, ending initialization of the EMB.

2. The initialization method for claim 1, wherein the determining of whether the gap between the master piston and the slave piston is equal to or more than the preset gap comprises:
    when it is determined that the gap is less than the preset gap, opening the out-valve, and driving the motor to move the master piston forward until the master piston comes in contact with the slave piston;
    when the master piston comes in contact with the slave piston, opening the in-valve, closing the out-valve, and driving the motor to move the master piston forward by the preset distance; and
    when the master piston is moved by the preset distance after coming in contact with the slave piston, closing the in-valve, opening the out-valve, and driving the motor to move the master piston backward.

3. The initialization method for claim 1, wherein the slave piston is moved by hydraulic pressure which is formed according to the movement of the master piston.

4. The initialization method for claim 1, wherein as the master piston has a smaller cross-sectional area than the slave piston, the master piston has a larger displacement than the slave piston.

5. The initialization method for claim 1, wherein as the in-valve is opened, the brake oil is introduced into the slave piston from the master cylinder.

6. The initialization method for claim 1, wherein as the out-valve is opened, the brake oil introduced into the slave piston is transferred to the accumulator part.

7. The initialization method for claim 1, wherein when a current of the motor is equal to or more than a preset current while the master piston is moved forward, it is determined that the master piston is brought in contact with the slave piston.

8. The initialization method for claim 1, wherein the determining of whether the gap between the master piston and the slave piston is equal to or more than the preset gap comprises determining whether the gap between the master piston and the slave piston is equal to or more than the preset gap, by referring to the backward moving distance of the master piston and the displacement of the slave piston which is moved through hydraulic pressure formed by the brake oil introduced into the slave piston.

9. The initialization method for claim 1, wherein the EMB comprises a hydraulic EMB (hEMB) which brakes a vehicle using the master piston which is moved by the motor and the slave piston which is moved through hydraulic pressure formed by the brake oil introduced into the slave piston according to the movement of the master piston.

10. An initialization method for an EMB, comprising:
    a contact determination step of determining whether a master piston and a slave piston are brought in contact with each other before a brake pad and a brake disk are brought in contact with each other by the slave piston moved in connection with the master piston, when an in-valve for controlling entry and exit of brake oil to and from a master cylinder is closed, an out-valve for controlling entry and exit of brake oil to and from an accumulator part is closed, and a motor is rotated to move the master piston forward;

a piston gap determination step of determining whether a moving distance required until the master piston comes in contact with the slave piston corresponds to a first section, when the master piston is moved forward in state where the out-valve is opened, in case where it is determined that the brake pad and the brake disk were brought in contact with each other before the master piston and the slave piston were brought in contact with each other; and a pad gap securing step of moving the master piston backward until a pad gap between the slave piston and the brake pad corresponds to a second section, when the moving distance of the master piston corresponds to the first section, and ending initialization of the EMB.

11. The initialization method for claim 10, wherein the piston gap determination step comprises:

an additional forward movement step of moving the master piston forward until the brake pad and the brake disk are brought in contact with each other in a state where the in-valve is opened, when it is determined that the brake pad and the brake disk were brought in contact with each other after the master piston and the slave piston were brought in contact with each other; and an oil injection step of moving the master cylinder backward by a distance corresponding to the first section by injecting brake oil through the in-valve, when the brake pad and the brake disk are brought in contact with each other through the additional forward movement step.

12. The initialization method for claim 10, wherein the slave piston is moved by hydraulic pressure which is formed according to the movement of the master piston.

13. The initialization method for claim 10, wherein as the master piston has a smaller cross-sectional area than the slave piston, the master piston has a larger displacement than the slave piston.

14. The initialization method for claim 10, wherein as the in-valve is opened, the brake oil is introduced into the slave piston from the master cylinder.

15. The initialization method for claim 10, wherein as the out-valve is opened, the brake oil introduced into the slave piston is transferred to the accumulator part.

16. The initialization method for claim 10, wherein the contact determination step comprises determining that the brake pad and the brake disk were brought in contact with each other before the master piston came in contact with the slave piston, when a pressure measured through a pressure sensor connected to a hydraulic pressure chamber is equal to or more than a preset pressure while the master piston is moved forward.

17. The initialization method for claim 10, wherein the piston gap determination step determines that the master piston is brought in contact with the slave piston, when a current of the motor is equal to or more than a preset current while the master piston is moved forward.

18. The initialization method for claim 10, wherein the EMB comprises an hEMB which brakes a vehicle using the master piston which is moved by the motor and the slave piston which is moved through hydraulic pressure formed by the brake oil introduced into the slave piston according to the movement of the master piston.

* * * * *